(12) United States Patent
Jeung

(10) Patent No.: US 8,138,710 B2
(45) Date of Patent: Mar. 20, 2012

(54) POWER DRIVE OF ELECTRIC MOTOR

(75) Inventor: Young-Chun Jeung, Cypress, CA (US)

(73) Assignee: SNTech Inc., Pheonix, AZ (US)

( * ) Notice: Subject to any disclaimer, the term of this patent is extended or adjusted under 35 U.S.C. 154(b) by 216 days.

(21) Appl. No.: 12/192,011

(22) Filed: Aug. 14, 2008

(65) Prior Publication Data

US 2010/0039058 A1    Feb. 18, 2010

(51) Int. Cl.
*H02P 27/00* (2006.01)
(52) U.S. Cl. .................... 318/803; 318/812; 318/558
(58) Field of Classification Search .................. 318/432, 318/400.04, 400.13, 400.14, 400.16, 400.17, 318/779, 800, 801, 803, 811–813; 388/806, 388/811; 417/410.1; 320/140, 141, 145; 62/186, 228.4, 323.3; 165/244
See application file for complete search history.

(56) References Cited

U.S. PATENT DOCUMENTS

| | | | |
|---|---|---|---|
| 3,299,335 A | 1/1967 | Wessels |
| 3,444,406 A | 5/1969 | Aha |
| 3,457,486 A | 7/1969 | Soeda |
| 3,531,702 A | 9/1970 | Hill |
| 3,604,960 A | 9/1971 | Krestel |
| 3,787,014 A | 1/1974 | Story et al. |
| 3,878,809 A | 4/1975 | Ray |
| 4,004,202 A | 1/1977 | Davis |
| 4,271,385 A | 6/1981 | Azusawa |
| 4,384,224 A | 5/1983 | Spitler et al. |
| 4,389,606 A | 6/1983 | Detering |
| 4,544,856 A | 10/1985 | King |
| 4,642,885 A | 2/1987 | King |
| 4,668,898 A | 5/1987 | Harms et al. |
| 4,712,030 A | 12/1987 | Lakin et al. |
| 4,774,448 A | 9/1988 | Yoshitomi |
| 4,888,530 A | 12/1989 | Radik et al. |
| 5,243,732 A | 9/1993 | Koharagi et al. |
| 5,492,273 A | 2/1996 | Shah |
| 5,559,407 A | 9/1996 | Dudley et al. |

(Continued)

FOREIGN PATENT DOCUMENTS

FR    2 896 638 A    7/2007

(Continued)

*Primary Examiner* — Eduardo Colon
(74) *Attorney, Agent, or Firm* — Knobbe Martens Olson & Bear LLP

(57) ABSTRACT

Some embodiment of the present disclosure provide an electric motor comprising a power drive configured to supply electric power to different components of the motor that operate with different power inputs. The motor is configured to transform the electric power into mechanical work to perform on a load. The electric motor is configured to be used as a pump or a blower in a HVAC system. The electric motor includes a first power source connected to and supplying an electric power to the windings of the motor, a second power source connected to and supplying an electric power to a logic circuit configured to control operation of the motor, a third power source connected to and supplying an electric power to an external device that is configured to be connected to the motor and not enclosed in a housing, and a housing enclosing the first, second, and third power source. Another embodiment of the disclosure provides a method of supplying power in an electric motor, wherein the method includes providing a motor comprising windings, a logic circuit, an external power outlet accessible from outside a housing of the motor. The method further includes supplying a first electric power to the windings, supplying an electric power to the logic circuit, and supplying a third electric power to the external power outlet.

21 Claims, 5 Drawing Sheets

U.S. PATENT DOCUMENTS

| | | | |
|---|---|---|---|
| 5,592,058 A | 1/1997 | Archer et al. | |
| 5,663,616 A | 9/1997 | Stringfellow et al. | |
| 5,680,021 A | 10/1997 | Hollenbeck | |
| 5,739,614 A | 4/1998 | Suzuki et al. | |
| 5,767,635 A | 6/1998 | Steffens et al. | |
| 5,818,194 A | 10/1998 | Nordby | |
| 6,035,265 A * | 3/2000 | Dister et al. | 702/183 |
| 6,209,622 B1 | 4/2001 | Lagace et al. | |
| 6,310,452 B1 | 10/2001 | Deck et al. | |
| 6,369,536 B2 | 4/2002 | Beifus et al. | |
| RE38,406 E | 1/2004 | Faris et al. | |
| 6,801,013 B2 | 10/2004 | Woodward et al. | |
| 6,864,657 B1 | 3/2005 | Lungu | |
| 6,924,611 B1 | 8/2005 | Tzeng et al. | |
| 6,952,088 B2 | 10/2005 | Woodward et al. | |
| 7,015,663 B1 | 3/2006 | Tzeng et al. | |
| 7,042,180 B2 | 5/2006 | Terry et al. | |
| 7,057,376 B2 * | 6/2006 | Cook et al. | 323/207 |
| 7,131,398 B2 | 11/2006 | Cohen et al. | |
| 7,176,658 B2 * | 2/2007 | Quazi et al. | 322/24 |
| 7,268,505 B2 | 9/2007 | Pant et al. | |
| 7,272,302 B2 | 9/2007 | Woodward et al. | |
| 7,296,753 B1 | 11/2007 | Zucker | |
| 7,327,118 B2 | 2/2008 | Pant et al. | |
| 7,378,821 B2 | 5/2008 | Simpson, III | |
| 7,443,119 B2 | 10/2008 | Liu | |
| 7,458,228 B2 | 12/2008 | Lagace et al. | |
| 7,466,089 B2 * | 12/2008 | Beifus | 318/254.1 |
| 7,590,334 B2 | 9/2009 | Yabusaki et al. | |
| 7,657,161 B2 | 2/2010 | Jeung | |
| 7,719,214 B2 | 5/2010 | Leehey et al. | |
| 7,795,827 B2 * | 9/2010 | Jeung | 318/400.04 |
| 8,049,447 B2 | 11/2011 | Jeung | |
| 2002/0047348 A1 | 4/2002 | Ohiwa et al. | |
| 2003/0001442 A1 | 1/2003 | Hsu | |
| 2003/0080772 A1 | 5/2003 | Giacomini et al. | |
| 2003/0173924 A1 | 9/2003 | Blase et al. | |
| 2004/0232871 A1 | 11/2004 | Deck et al. | |
| 2005/0029976 A1 | 2/2005 | Terry et al. | |
| 2005/0162108 A1 | 7/2005 | Pant et al. | |
| 2005/0253744 A1 | 11/2005 | Kern | |
| 2006/0291820 A1 | 12/2006 | Kobayashi | |
| 2007/0024250 A1 | 2/2007 | Simpson, III | |
| 2007/0184339 A1 * | 8/2007 | Scheucher | 429/99 |
| 2007/0247091 A1 | 10/2007 | Maiocchi | |
| 2007/0274113 A1 * | 11/2007 | Wang et al. | 363/109 |
| 2008/0053716 A1 * | 3/2008 | Scheucher | 180/2.1 |
| 2008/0084171 A1 | 4/2008 | Leehey et al. | |
| 2008/0286088 A1 * | 11/2008 | Chen et al. | 388/819 |
| 2009/0039807 A1 | 2/2009 | Yabusaki et al. | |
| 2009/0039820 A1 | 2/2009 | Milano et al. | |
| 2009/0134823 A1 | 5/2009 | Jeung | |
| 2009/0134827 A1 | 5/2009 | Jeung | |
| 2009/0136220 A1 | 5/2009 | Jeung | |
| 2009/0136359 A1 | 5/2009 | Jeung | |
| 2009/0136360 A1 | 5/2009 | Jeung | |
| 2009/0137199 A1 | 5/2009 | Jeung | |
| 2009/0218968 A1 | 9/2009 | Jeung | |
| 2009/0218971 A1 | 9/2009 | Jeung | |
| 2009/0224709 A1 | 9/2009 | Jeung | |
| 2009/0267549 A1 | 10/2009 | Kitagawa | |
| 2009/0284201 A1 | 11/2009 | Jeung | |
| 2009/0315494 A1 | 12/2009 | Jeung et al. | |
| 2009/0315496 A1 | 12/2009 | Jeung et al. | |
| 2009/0315497 A1 | 12/2009 | Jeung et al. | |
| 2009/0315498 A1 | 12/2009 | Jeung et al. | |
| 2010/0039055 A1 | 2/2010 | Jeung | |
| 2010/0157638 A1 * | 6/2010 | Naiknaware et al. | 363/131 |

FOREIGN PATENT DOCUMENTS

| | | |
|---|---|---|
| JP | 03248248 B2 | 1/2002 |
| JP | 2004-023823 A | 1/2004 |
| JP | 2004-56887 A | 2/2004 |
| JP | 2004-304928 A | 10/2004 |
| JP | 2005-168241 A | 6/2005 |
| KR | 10-2006-0115930 A | 11/2006 |
| KR | 10-0696854 B1 | 3/2007 |
| WO | 2009-111503 A2 | 9/2009 |
| WO | 2009-140419 A2 | 11/2009 |
| WO | 2009-158359 A2 | 12/2009 |

* cited by examiner

POWER DRIVE OF ELECTRIC MOTOR

BACKGROUND

1. Field

The present disclosure relates to a power drive of an electric brushless motor.

2. Description of the Related Technology

Electric brushless motors are widely used for driving a blower or a fan of a HVAC (heating, ventilation, and air conditioning). For the operation of the electric motor there are various components within and in connection with the motor that need electrical power.

SUMMARY

These and other problems are solved by an electric motor comprising a power drive configured to supply electric power to different components of the motor that operate with different power inputs. The motor is configured to transform the electric power into mechanical work to perform on a load. The electric motor can be configured to be used as a pump or a blower in a HVAC system.

One embodiment of the present disclosure includes a first power source connected to and supplying an electric power to the windings of the motor, a second power source connected to and supplying an electric power to a logic circuit configured to control operation of the motor, a third power source connected to and supplying an electric power to an external device that is configured to be connected to the motor and not enclosed in a housing, and a housing enclosing the first, second, and third power source.

One embodiment includes a power outlet accessible from outside the housing, wherein the power outlet is connected to the third power source. And the external device can be connected to the power outlet and the power outlet is configured to supply power to the external device, wherein the power outlet is configured to supply level voltage about 5, 12, or 24 volts for example and anywhere between 0 to 1 MVolts. The external device in connection with the motor can include a control interface configured to input control signals to the motor and a communication device configured to load programs and factory settings to the motor.

In an embodiment, the electric motor further includes a converter enclosed in the housing and configured to convert an Alternating current (AC) power supplied from the outside of the housing to a direct current (DC) power. The components of the motor may require DC power. The electric motor yet further includes a transformer enclosed in the housing and configured to transform an input voltage from the converter into at least one output voltage.

In one embodiment of the present disclosure, the first power source includes a power switching circuit in connection with the windings, wherein the power switching circuit is configured to supply current to the windings of the motor and rotate the rotor of the motor to perform mechanical work by the motor.

In another embodiment of the present disclosure, the logic circuit of the motor includes a microprocessor, a control chip, and gate drives that process control commands for controlling motor operation. The microprocessor generates PWM signals to control the speed of rotation of the rotor of the motor. The second power source is configured to supply logic level voltage from about 5 volts to about 15 volts to the logic circuit.

One embodiment of the present disclosure includes a method of supplying power in an electric motor. The method includes providing a motor comprising windings, a logic circuit, an external power outlet accessible from outside a housing of the motor. The method further includes supplying a first electric power to the windings, supplying a electric power to the logic circuit, and supplying a third electric power to the external power outlet.

The method further includes converting an AC power supplied from outside the housing of the motor into DC power. The method further includes transforming the input power from the converter into at least one output voltage.

In one embodiment of the disclosure, the supplying of a first electric power includes combining the PWM signal from the logic circuit and the DC power supplied from the converter within the power switch circuit and thereby supplying electric current to the windings. The supplying of a second voltage of electric power includes supplying from about 5 volts to about 15 volts to the logic circuit.

In another embodiment, the external devices are connected to the external power outlet and the external power outlet is supplying power to the external devices, wherein the external power outlet is configured to supply electric voltage of about 12 volts.

DETAILED DESCRIPTION OF THE EMBODIMENTS

In an electric motor a power drive provides power to various components of the motor requiring different voltage inputs. The power drive is configured to provide power to windings of stator of the motor, logic level power to controller of the motor, and power to operate external components in connection to the motor. The power drive includes an alternating current (AC) power source, alternating current (AC) to direct current (DC) converter, and a first, second, and third power sources.

Figure 1:
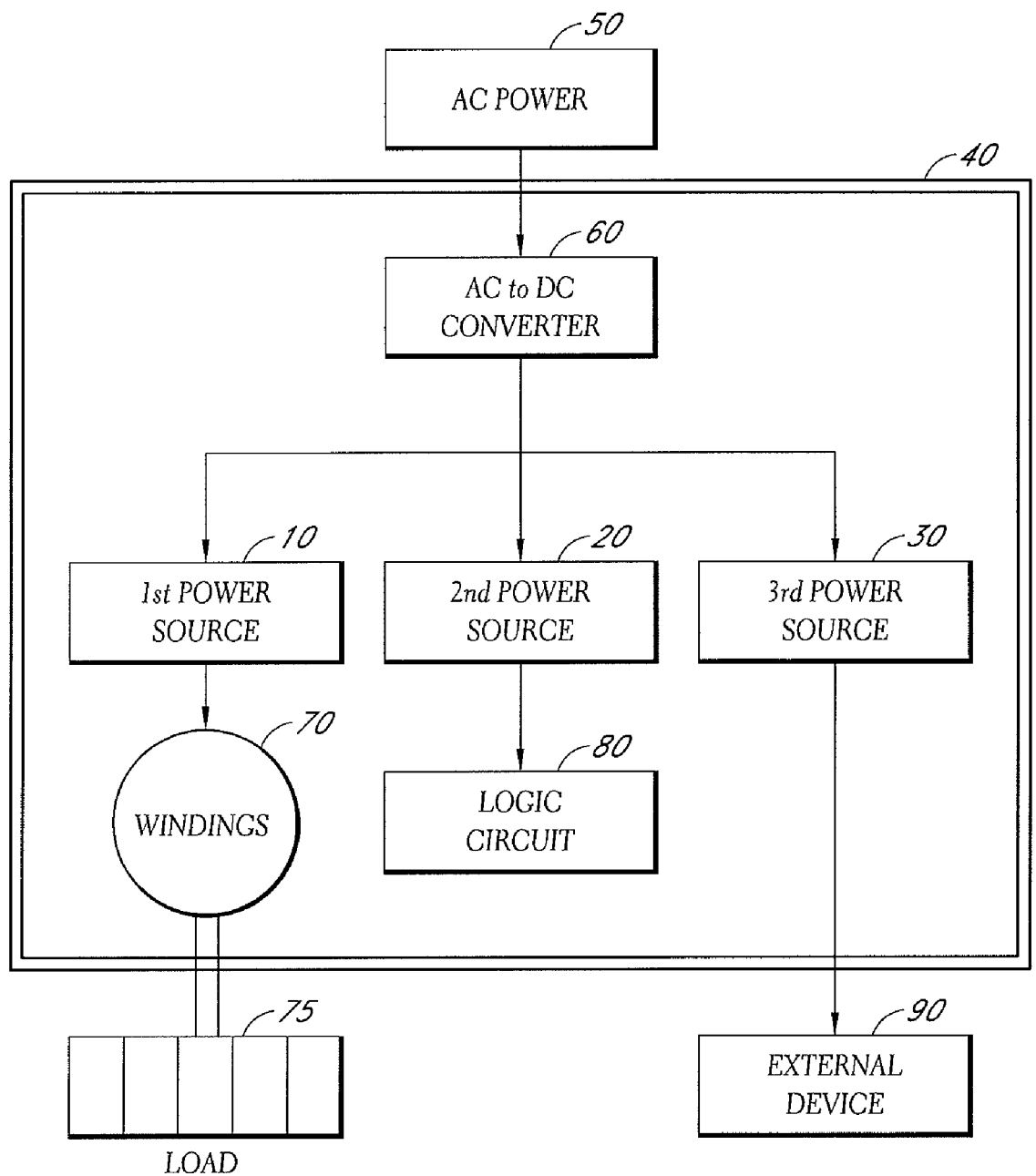
FIG. 1 illustrates a block diagram of the power drive of the motor control system according to an embodiment of the disclosure.

FIG. 1 shows a block diagram of the power drive of the motor control system. The power drive includes an AC power source 50 configured to supply the power to the motor. The AC power source 50 can be a conventional electric outlet that provides electric power. The power drive further includes an AC to DC converter 60 that is configured to receive the AC power input from the AC power source 50 and convert it into DC power for operating components of the motor. After the power has been converted to DC, the power is transferred to a first, second, and third power sources configured to provide power to different components of the motor. The motor further includes a housing 40 enclosing the converter and the power sources.

The first power source 10 supplies the power to coil windings 70 of a stator of the motor. The first power source 10 supplies current to the windings 70 of the stator of the electric motor to create an electromagnetic field. A rotor of the motor includes permanent magnets that interact with the electromagnetic fields and the rotor is configured to rotate and perform mechanical work. The motor, in turn, is configured to perform work on the load 75 outside the housing 40 in connection to the motor. The second power source 20 supplies logic level voltages that can be used in the logic circuit 80. The logic circuit 80 is configured to control the speed and direction of the rotation of the rotor according to operating conditions. The second power source 20 includes a transformer to transform the incoming power voltage from the converter 60 into voltages adequate for operation of logic circuit 80. The third power source 30 supplies power to external devices 90 outside the housing 40 that can be connected to the motor. The third power source can also include electrical outlets that provide power to the external devices 90 that can be connected to the electrical outlets.

Figure 2:
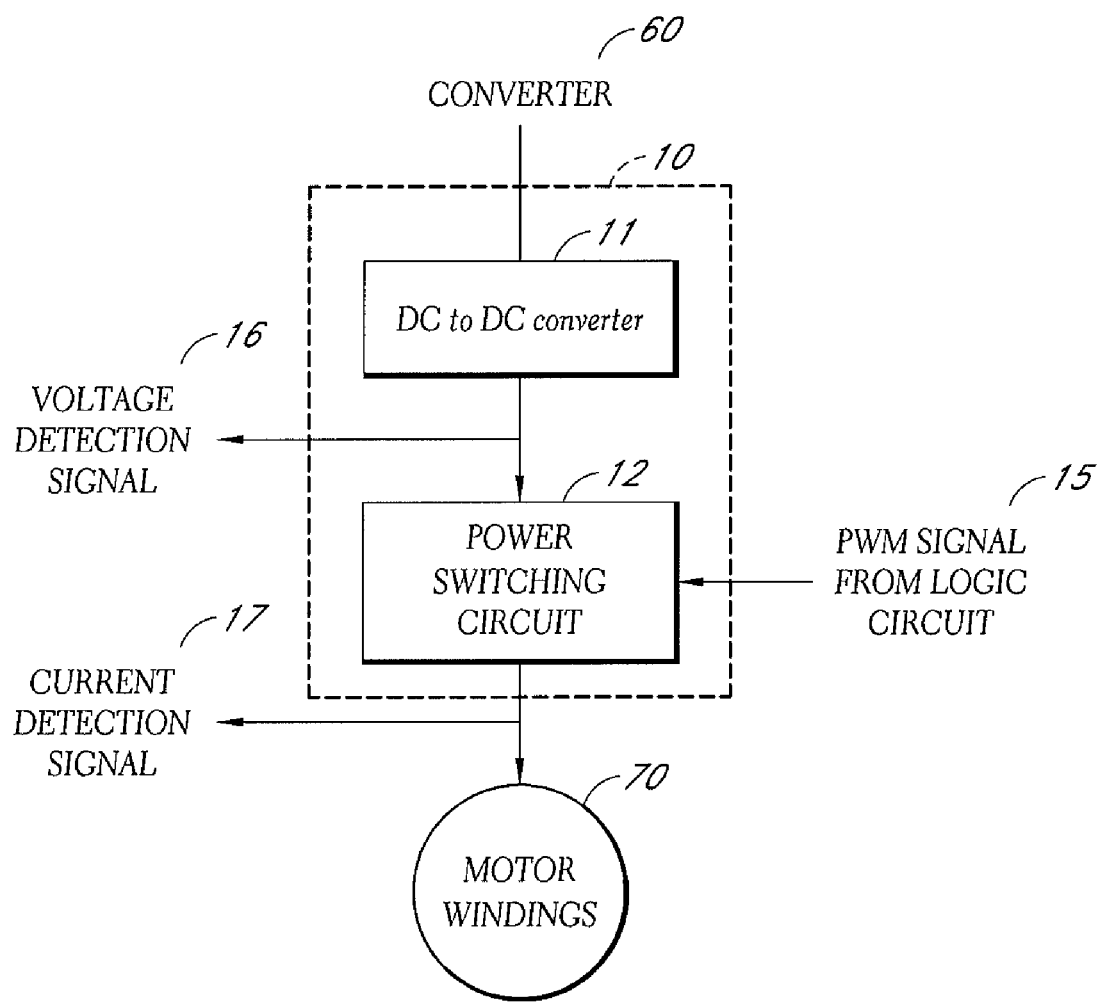
FIG. 2 illustrates an embodiment of the first power source of the power drive.

FIG. 2 illustrates an embodiment of the first power source 10. It includes a first DC to DC converter (transformer) 11 and a power switching circuit 12. The first DC to DC converter 11 transforms the voltage input from the AC to DC converter 60 into a different voltage and outputs it to the power switching circuit 12. The power switching circuit 12 also receives input signal 15 from the logic circuit 80. Based on the performance of the motor, the logic circuit 80 outputs a PWM (pulse width modulation) signal to control the current supplied to windings of the motor 70 and consequently control the speed and direction of rotation of the rotor of the motor. The power switching circuit 12 is configured to receive the DC power from the DC to DC converter 11 and the PWM signal 15 from the logic circuit 80 and combine them to generate a current to supply the windings 70 of the stator of the motor. The first power source 10 further includes a voltage detector 16 and a current detector 17 configured to send signals to a microprocessor in the logic circuit 80. And these signals will contribute in controlling the operation of the motor by the logic circuit 80. In other embodiments the motor can have a universal DC to DC converter (transformer) that converts one input voltage from the converter 60 into multiple output voltages to supply to the first, second, and third power sources.

Figure 3:
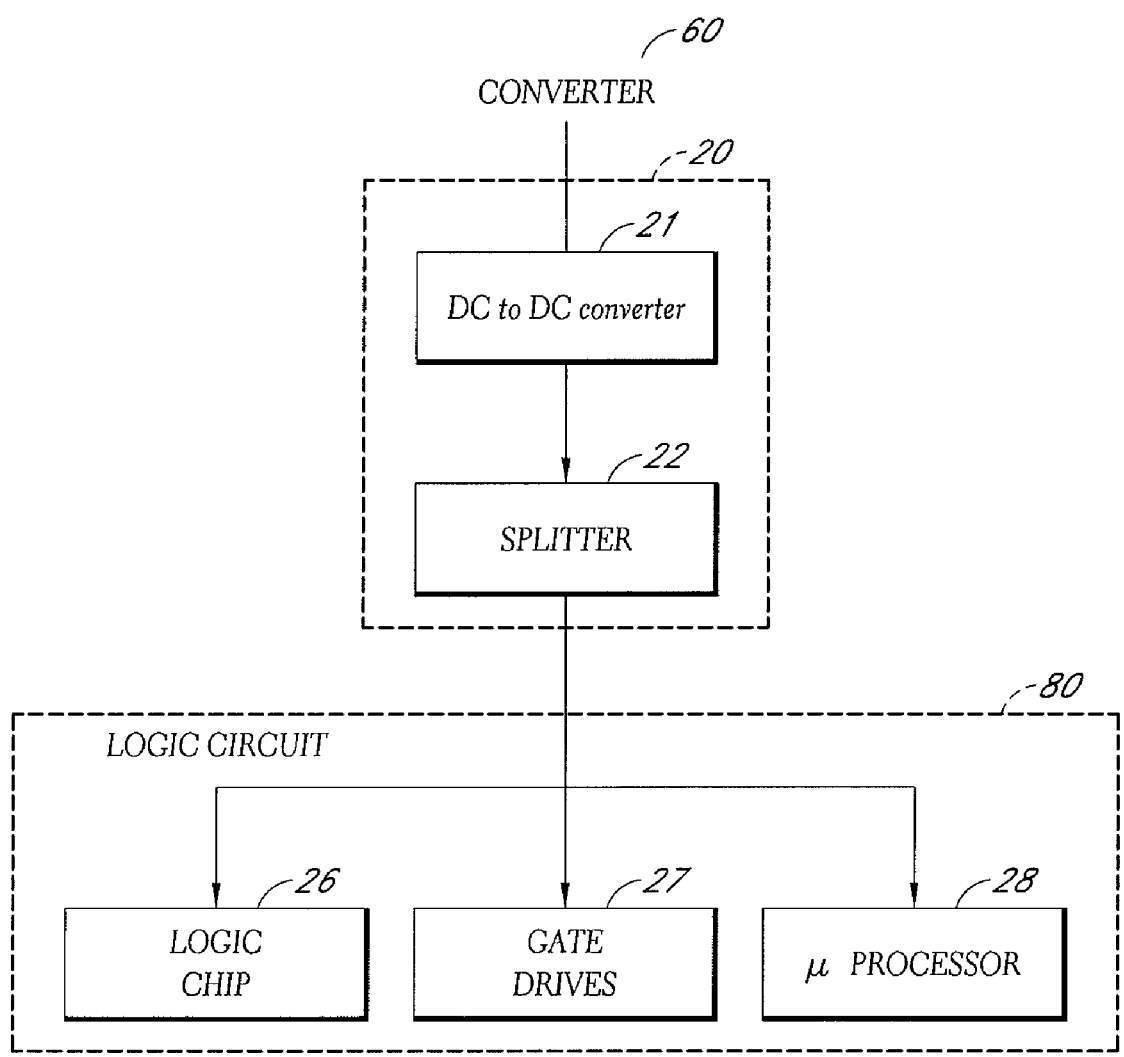
FIG. 3 illustrates an embodiment of the second power source of the power drive.

FIG. 3 illustrates an embodiment of the second power source 20. It includes a second DC to DC converter 21 receiving the voltage input from the converter 60 and supplying logic level voltages to the logic circuit 80. The logic level voltages range from about 5 volts to about 15 volts. The second power source 20 also includes a voltage splitter 22 configured to supply power to different components of the logic circuit 80. The logic circuit 80 includes a control chip 26, gate drives 27, and a microprocessor 28. The microprocessor 28 generates PWM signals to output to the power switching circuit 12 of the first power source 10. In other embodiments the motor can have a universal DC to DC converter (transformer) that converts one input voltage from the converter 60 into multiple output voltages to supply to the first, second, and third power sources.

Figure 4A:
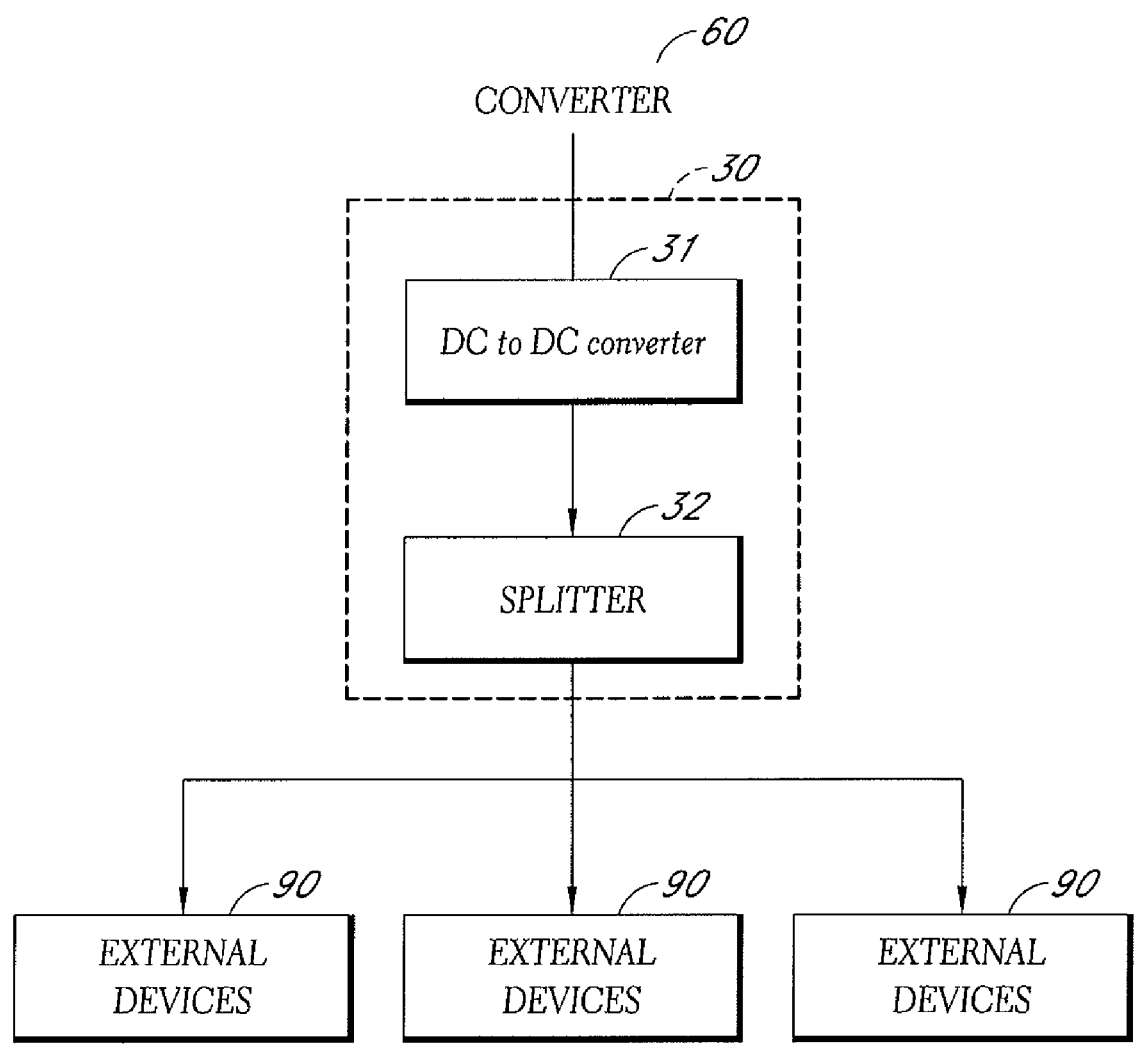
FIG. 4a illustrates an embodiment of the third power source of the power drive.

FIG. 4a illustrates an embodiment of the third power source 30. In one embodiment the third power source includes a third DC to DC converter 31 and a voltage splitter 32. The third DC to DC converter 31 drops the voltage input from the AC to DC converter 60 of the motor into voltages adequate as power source for external devices 90. An example of the output voltage from the third power source 30 is about 12 volts. The external device 90 includes a control interface and a programmer. In other embodiments the motor can have a universal DC to DC converter (transformer) that converts one input voltage from the converter 60 into multiple output voltages to supply to the first, second, and third power sources.

Figure 4B:
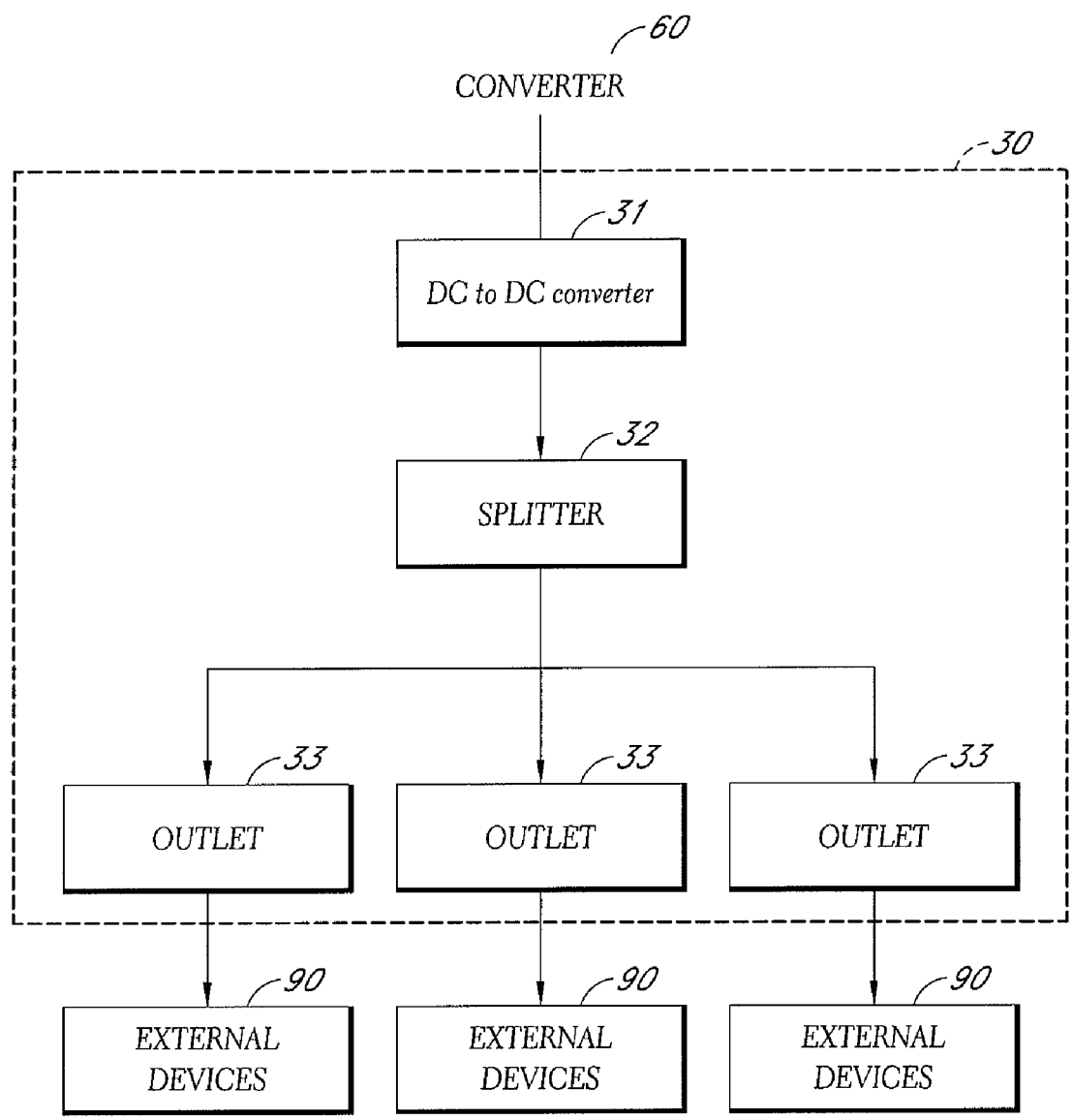
FIG. 4b illustrates another embodiment of the third power source of the power drive.

FIG. 4b illustrates another embodiment of the third power source 30. One embodiment includes electrical outlets 33 connected to the third power source 30. The electrical outlets 33 are configured to be positioned on the surface of the motor housing 40 so that external electrical devices can be connected to them. The external devices 90 are configured to be connected to the electrical outlets 33 and draw the necessary power to operate. An example of the power output from the electrical outlet 33 is about 12 volts.

Although a few embodiments of the present invention have been shown and described, the present invention is not limited to the described embodiments. Instead, it would be appreciated by those skilled in the art that changes can be made to these embodiments without departing from the principles and spirit of the invention, the scope of which is defined by the claims and their equivalents.

What is claimed is:

1. An electric motor comprising:
a first power source supplying first electric power to windings of the motor;
a second power source supplying second electric power to a logic circuit of the motor;
a third power source supplying third electric power to an external device when the external device is connected to the motor; and
a motor housing enclosing the windings, the logic circuit, the first, second, and third power sources.

2. The electric motor of claim 1, wherein the external device comprises a control interface configured to input control signals to the motor, and a communication device configured to load programs and settings to the motor.

3. The electric motor of claim 1, further comprising a power outlet accessible from outside the housing, wherein the power outlet is connected to the third power source.

4. The electric motor of claim 3, wherein the external device is configured to get connected to the power outlet and the power outlet is configured to supply the third electric power to the external device.

5. The electric motor of claim 3, wherein the power outlet is configured to supply voltage of about 12 volts.

6. The electric motor of claim 1, further comprising a converter enclosed in the housing and configured to convert an AC power supplied from the outside of the housing to a DC power.

7. The electric motor of claim 6, further comprising a transformer enclosed in the housing and configured to transform an input voltage from the converter into at least one output voltage.

8. The electric motor of claim 1, wherein the first power source comprises a power switching circuit electrically connected to the windings, wherein the power switching circuit is configured to supply current to the windings of the motor and rotate the rotor of the motor to perform mechanical work by the motor.

9. The electric motor of claim 1, wherein the logic circuit comprises a microprocessor, a control chip, and gate drives that process control commands for controlling motor operation.

10. The electric motor of claim 9, wherein the second power source is configured to supply the second electric power at logic level voltage from about 5 volts to about 15 volts.

11. The electric motor of claim 9, wherein the microprocessor generates PWM signals to control the speed of rotation of a rotor of the motor.

12. The electric motor of claim 1, wherein the electric motor is configured to be used as a pump or a blower in a HVAC system.

13. A method of supplying power in a motor comprising:
providing the electric motor of claim 1;
supplying the first electric power from the first power source to the windings;
supplying the second electric power from the second power source to the logic circuit; and
supplying the third electric power from the third power source to an external power outlet.

14. The method of claim 13, wherein the method further comprises supplying an AC power to the motor and thereby supplying the first, the second, and the third electric power.

15. The method of claim 14, wherein the method further comprises converting the AC power into a DC power.

16. The method of claim 15, wherein the method further comprises transforming the DC power into at least one output voltage.

17. The method of claim 13, wherein the method further comprises providing a power switching circuit.

18. The method of claim 17, wherein supplying the first electric power comprises providing the first electric power to the windings by the power switching circuit, wherein the power switching circuit is configured to provide the first electric power based on a PWM signal from the logic circuit.

19. The method of claim 13, wherein the second electric power is supplied to the logic circuit at logic level voltage from about 5 volts to about 15 volts.

20. The method of claim 13, wherein the third electric power is supplied to the external power outlet at about 12 volts.

21. An electric motor comprising:
a first power source supplying first electric power to windings of the motor;
a second power source supplying second electric power to a logic circuit of the motor;
a third power source supplying third electric power to a circuit that is configured to connect with an external device and communicate with the external device; and
a motor housing enclosing the windings, the logic circuit, the first, second, and third power sources.

* * * * *